(12) United States Patent
Cao et al.

(10) Patent No.: US 10,536,355 B1
(45) Date of Patent: Jan. 14, 2020

(54) MONITORING AND ANALYTICS SYSTEM (71) Applicant: EMC Corporation, Hopkinton, MA (US)

(72) Inventors: Yu Cao, Beijing (CN); Simon Tao, Shanghai (CN); Xiaoyan Guo, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 368 days.

(21) Appl. No.: 14/742,183

(22) Filed: Jun. 17, 2015

(51) Int. Cl.
*H04L 12/26* (2006.01)
*G06F 15/16* (2006.01)
*G06F 3/06* (2006.01)

(52) U.S. Cl.
CPC .......... *H04L 43/045* (2013.01); *G06F 3/0604* (2013.01); *G06F 3/0638* (2013.01); *G06F 15/16* (2013.01)

(58) Field of Classification Search
None
See application file for complete search history.

(56) References Cited

U.S. PATENT DOCUMENTS

| | | | |
|---|---|---|---|
| 7,403,987 B1* | 7/2008 | Marinelli ............ | H04L 43/0817 707/999.202 |
| 8,010,956 B1* | 8/2011 | Shtilman ............... | G06F 8/4442 717/158 |
| 2008/0027961 A1* | 1/2008 | Arlitt .................. | G06F 11/3452 |
| 2008/0037532 A1* | 2/2008 | Sykes .................... | H04L 41/147 370/389 |
| 2011/0320586 A1* | 12/2011 | Maltz .................... | G06F 9/5027 709/224 |
| 2012/0173717 A1* | 7/2012 | Kohli ................... | G06F 11/3006 709/224 |
| 2013/0159512 A1* | 6/2013 | Groves ................. | H04L 43/045 709/224 |
| 2013/0346594 A1* | 12/2013 | Banerjee ............. | G06F 11/3409 709/224 |
| 2014/0156777 A1* | 6/2014 | Subbiah .............. | H04L 67/1097 709/213 |
| 2014/0244452 A1* | 8/2014 | Maiona ................. | G06Q 40/12 705/30 |
| 2016/0057291 A1* | 2/2016 | Iyer ........................ | G06Q 10/00 455/406 |
| 2016/0087861 A1* | 3/2016 | Kuan .................... | H04L 43/065 709/224 |
| 2016/0188370 A1* | 6/2016 | Razin ...................... | G06F 11/30 718/104 |
| 2016/0275201 A1* | 9/2016 | Li ........................ | G06F 16/9024 |

* cited by examiner

*Primary Examiner* — Younes Naji
(74) *Attorney, Agent, or Firm* — Ryan, Mason & Lewis, LLP (57) ABSTRACT

A computing system is monitored by collecting monitoring information from two or more different monitoring tools associated with respective portions of the computing system, where the monitoring tools having different information collection capabilities associated therewith. The monitoring information received from the different monitoring tools is consolidated in a unified data store. The unified data store is utilized to perform analytics relating to inter-dependencies of storage, compute and networking components of the computing system managed by different ones of the monitoring tools. The analytics results are presented utilizing a monitoring dashboard.

20 Claims, 8 Drawing Sheets

MONITORING AND ANALYTICS SYSTEM

FIELD

The field relates generally to computing environments, and more particularly to monitoring in such computing environments.

BACKGROUND

A software-defined data center (SDDC) is a computing system wherein elements of the infrastructure, e.g., networking, storage, compute, etc., are virtualized and delivered to tenants (customers) of the data center as services. An SDDC is typically implemented in a cloud computing platform environment and the virtualized and delivered components are controlled through an Infrastructure-as-a-Service (IaaS) layer.

Various components in an SDDC expose management features via different monitoring tools. Such monitoring tools may be associated with different layers or portions of the SDDC. For example, different monitoring tools may be used for gathering monitoring information from networking, storage and compute components or layers of the SDDC.

SUMMARY

Embodiments of the invention provide techniques for system monitoring in a computing environment.

For example, in one embodiment, a method comprises the following steps. A computing system is monitored by collecting monitoring information from two or more different monitoring tools associated with respective portions of the computing system having different information collection capabilities associated therewith. The monitoring information received from the different monitoring tools is consolidated in a unified data store. The unified data store is utilized to perform analytics relating to inter-dependencies of storage, compute and networking components of the computing system managed by different ones of the monitoring tools. The analytics results are presented utilizing a monitoring dashboard.

Advantageously, illustrative embodiments provide techniques for efficient and effective monitoring and analytics that facilitates smart and secure storage and data services. While the techniques are applicable to a wide range of computing systems, illustrative embodiments are implemented with an SDDC infrastructure.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

It is realized herein that system monitoring is a demanding task in an IaaS environment because of the inherent complexity from the underlying infrastructure. Multi-tenancy imposes further challenges in effective and efficient monitoring for such environments where high agility and scalability become important characteristics. To help assure secure and healthy storage deployment and services in an SDDC, monitoring information from various functional components at different layers of the SDDC need to be captured and fed into advanced correlation analytics to generate actionable operational intelligence. Monitoring information includes, by way of example, events, metrics, status, notifications, logs, etc.

In order to overcome the above and other drawbacks with conventional monitoring approaches, illustrative embodiments provide a highly effective and efficient monitoring and analytics system that facilitates smart and secure storage and data services in a computing environment such as an SDDC. Various embodiments implement comprehensive, continuous and in-depth monitoring of computing environments to realize intelligent data center management.

Figure 1:
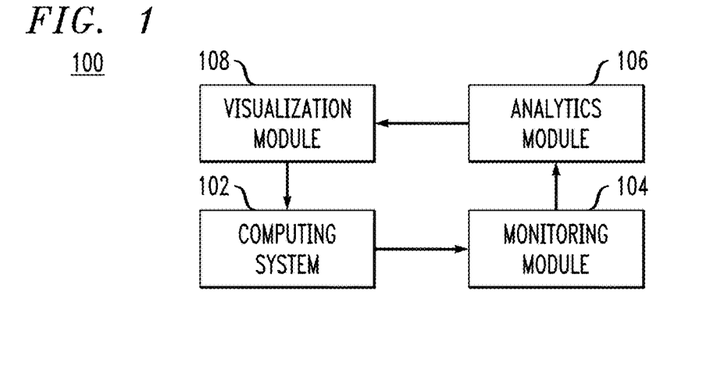
FIG. 1 illustrates a monitoring and analytics system, according to an embodiment of the invention.

FIG. 1 illustrates an example of a monitoring and analytics system 100. The system 100 includes a computing system 102, a monitoring module 104, an analytics module 106 and a visualization module 108. The monitoring module 104 is configured to monitor the computing system 102 by collecting monitoring information from two or more different monitoring tools associated with respective portions of the computing system, where the monitoring tools have different information collection capabilities associated therewith. Various examples of monitoring tools will be described below. The monitoring module 104 is further configured to consolidate the monitoring information received from the different monitoring tools in a unified data store. The analytics module 106 is configured to utilize the unified data store to perform analytics relating to interdependencies of storage, compute and networking components of the computing system managed by different ones of the monitoring tools. The visualization module 108 is configured to present analytics results utilizing a monitoring dashboard.

Figure 2:
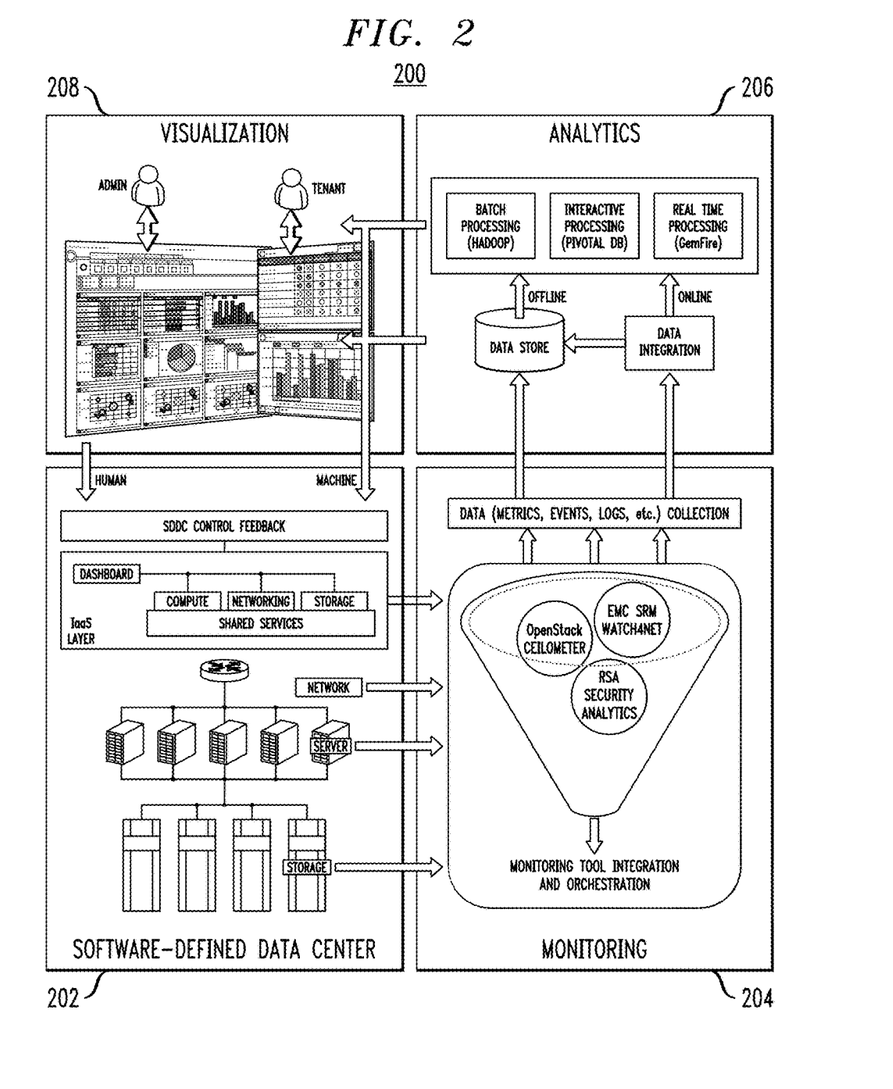
FIG. 2 illustrates another monitoring and analytics system, according to an embodiment of the invention.

FIG. 2 illustrates a monitoring and analytics system 200. In the system 200, the computing system is an SDDC 202. As detailed above, however, embodiments are not limited solely to use in monitoring SDDC computing environments. The system 200 further includes a monitoring module 204, an analytics module 206 and a visualization module 208. The elements of system 200 will be described in detail below with respect to FIGS. 3-8.

Figure 3:
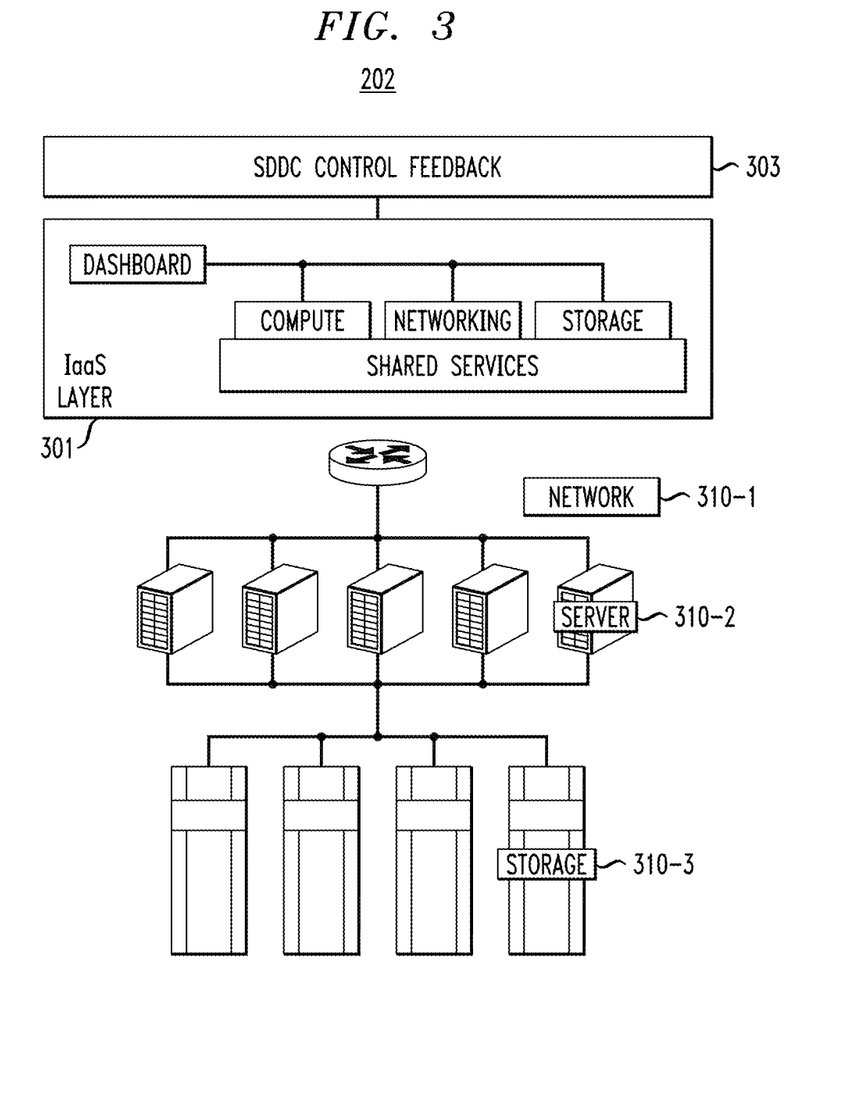
FIG. 3 illustrates a software-defined data center of the monitoring and analytics system of FIG. 2, according to an embodiment of the invention.

FIG. 3 shows a detailed view of the SDDC 202 of system 200. The SDDC 202 includes an IaaS layer 301, which itself comprises networking components 310-1 (e.g., routers, switches, etc.), compute components 310-2 (e.g., servers, hosts, etc.) and storage components 310-3 (e.g., storage arrays, storage devices, etc.). The SDDC 202 further includes an SDDC control feedback component 303, which is coupled to the monitoring module 204, analytics module 206 and visualization module 208 of the system 200 shown in FIG. 2.

By way of example only, the IaaS layer 301 may be implemented using OpenStack. As is known, OpenStack is a software platform that controls pools of compute, storage, and networking resources throughout a data center, managed through a dashboard or via the OpenStack application programming interface (API). OpenStack operates with enterprise and open source technologies enabling use with a wide variety of heterogeneous infrastructure components. Examples of storage components 310-3 may include, but are not limited to, VNX, VPLEX and Isilon storage systems (commercially available from EMC Corporation, Hopkinton, Mass.).

Figure 4:
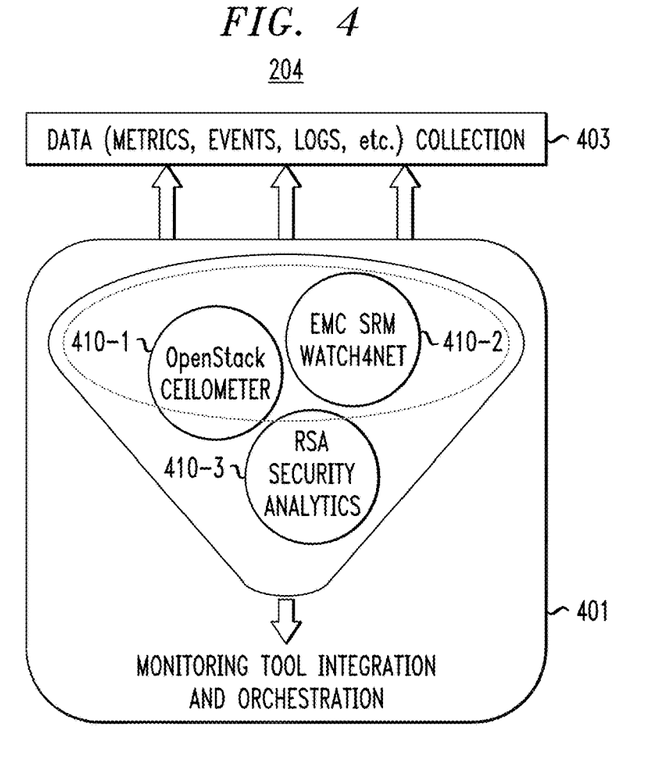
FIG. 4 illustrates a monitoring module of the monitoring and analytics system of FIG. 2, according to an embodiment of the invention.

FIG. 4 shows a detailed view of the monitoring module 204. As shown, the monitoring module 204 includes a monitoring tool integration and orchestration component 401 and a data collection component 403. The monitoring tool integration and orchestration component 401 integrates and consolidates information from various monitoring tools 410, including by way of example OpenStack Ceilometer 410-1, EMC Storage Resource Management (SRM) Suite/Watch4Net 410-2 and RSA Security Analytics 410-3. These monitoring tools are able to individually conduct comprehensive and integrated monitoring of portions of the SDDC, i.e., physical or virtual storage components, networking components and compute components as well as the host Software-Defined Network (SDN)/Network Virtualization (NV)-enabled infrastructure itself (e.g., OpenStack). For example, the OpenStack Ceilometer tool 410-1 can meter the use of resources and monitor the health of the SDDC 202, but does not monitor physical devices. The EMC SRM/Watch4Net tool 410-2 is designed for use in monitoring storage performance and Service-Level Agreements (SLAs), but does not support monitoring the host SDN/NV-enabled infrastructure itself. The RSA SA tool 410-3 is designed for use in security analytics by capturing network traffic, but does not support monitoring of storage components.

The monitoring tool integration and orchestration component 401 in conjunction with the data collection component 403 seamlessly consolidates information from the different monitoring tools 410 for comprehensive and integrated monitoring of computing environments such as the SDDC 202. It is important to note that the specific monitoring tools 410 shown in FIG. 4 are by way of example only. Various other monitoring tools may be used in addition to or in place of the specific monitoring tools 410 shown in FIG. 4 in other embodiments, including by way of example the EMC VNX Analyzer, Nagios, Zenoss, Splunk, etc.

The monitoring module 204 is designed to work with existing monitoring tools such as OpenStack Ceilometer 410-1, EMC SRM/Watch4Net 410-2 and RSA SA 410-3. The data collection component 403 in some embodiments leverages the metrics, events, logs and other information-collection capabilities and functionality of such monitoring tools.

The monitoring tool integration and orchestration component 401 supports declarative and on-demand monitoring via a unified user portal. For example, a user can simply declare what to monitor without having to specify or understand how the monitoring will be physically conducted. A monitoring request is automatically decomposed into several sub-tasks, each of which will be handled by one or multiple monitoring tools in a collaborative way. To this end, monitoring information, like metrics and events, will be abstracted and classified into different groups, each of which is linked to a set of monitoring tools with corresponding information collection capabilities. Those monitoring tools will be linked and orchestrated in a loose-coupled manner so as to retain flexibility and extensibility. Moreover, monitoring as a service is also supported.

The monitoring information gathered by the data collection component 403 may include various metrics, events, logs, etc. Various examples of such metrics and events are described below. It is to be appreciated, however, that the examples given below are not a comprehensive list of all possible metrics, events and other monitoring information which may be gathered or received by the data collection component 403.

The monitoring information may be associated with storage components of the SDDC 202. Such metrics and events include events related to storage for use in analyzing performance, availability, auditing, quotas, etc. The metrics may be for back-end storage providers or front-end storage tenants of the SDDC 202, including metrics and events for block devices, file storage and object storage. Block device metrics and events include, by way of example, usage percentage, size, type, block storage virtualization, Input/Output Operations Per Second (IOPS), throughput, etc. File storage metrics and events include, by way of example, utilization, size IOPS, throughput, checkpoints, etc. Object storage metrics and events include, by way of example, availability, size, usage, etc. Storage component-related events may also include mapping and topology related events such as creating, editing and deleting specific storage on all three types of storage (e.g., block device, file storage and object storage). Storage component-related events and metrics may further include health and alert logs for both back-end storage providers and front-end storage tenants of the SDDC 202.

Monitoring information can also be associated with compute components of the SDDC 202. Events related to compute components include, by way of example, notifications to start, stop or restart a virtual machine (VM) as well as notifications to create an image, instance or volume.

Metrics relating to compute components include CPU, memory, disk and network usage and CPU, memory, disk and network availability for particular hosts, guests, tenants, etc. Events related to compute components may also include mapping and topology related events such as tracking the migration of a VM among several hosts.

Networking components may also be a source of monitoring information. For example, monitoring information associated with networking components may include metrics and events such as network traffic metrics for back-end components and tenant-level applications, network configuration changes (e.g., creating, editing and removing network IDs), metrics from underlying components such as Network Virtualization Platform (NVP), Open vSwitch (OVS) or physical switches, etc.

Figure 5:
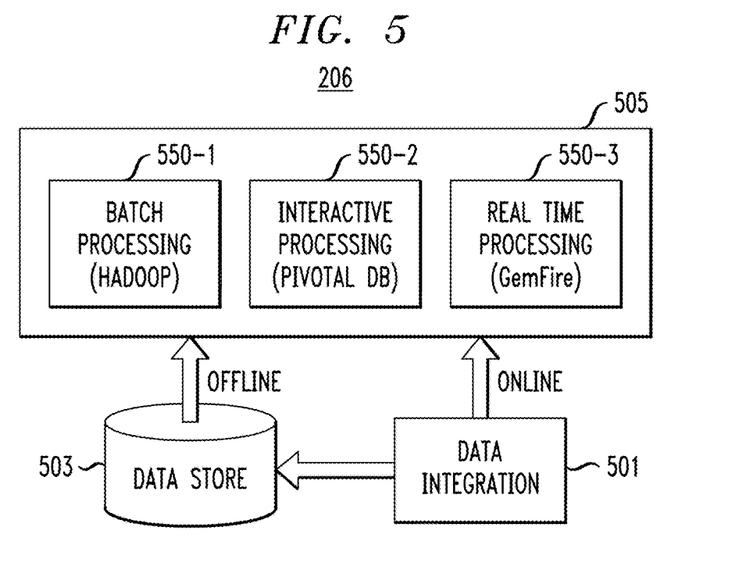
FIG. 5 illustrates an analytics module of the monitoring and analytics system of FIG. 2, according to an embodiment of the invention.

FIG. 5 shows a detailed view of the analytics module 206. The analytics module 206 utilizes the metrics, events, logs and other monitoring information from the monitoring module 204 to apply converged or consolidated analytics to understand storage, compute and networking inter-dependencies across components of the SDDC 202.

Different monitoring tools can use different kinds of data stores. For example, the OpenStack Ceilometer tool 410-1 utilizes MongoDB, while the EMC SRM/Watch4Net tool 410-2 utilizes MySQL and the RSA SA tool 410-3 including RSA NetWitness utilizes Greenplum Hadoop (GPHD) with Hadoop and Hbase. It is complicated and ineffective to leverage diverse data stores in a converged monitoring system.

Likewise, numerous (Big) Data Analytics techniques and tools, e.g. MapReduce, Complex Event Processing (CEP), Hadoop and Massively Parallel Processing (MPP) databases, are available for analytic purposes. However, it remains a challenge to leverage these techniques and tools to conduct meaningful and advanced analytics tasks for computing environments such as SDDCs. Such advanced analytics tasks include, by way of example, performing correlation analytics to aggregate all necessary monitored data into a unified data model/schema. As a result, it is useful to deeply investigate all captured data and target use cases to design a comprehensive data model for further advanced data analytics.

The analytics module 206 utilizes a data integration component 501 to create a unified data store 503. The data integration component 510 consolidates all the monitoring information in accordance with metadata stored in a metadata repository to provide users with a unified view of this data. In some embodiments, this consolidation is policy-based. Embodiments may utilize both pre-defined and user-defined policies. Examples of pre-defined policies include consolidating events and/or metrics of CPUs or virtual CPUs by host or by tenant, consolidating events and/or metrics of network traffic by virtual network or by tenant, consolidating disk Input/Output (I/O) metrics by host, by underlying logical unit (LUN) or by tenant, etc. In addition to such pre-defined policies, some embodiments allow a user such as a system administrator of the SDDC 202 to add additional policies.

In some embodiments, the data integration component 501 gathers collected and derived data from the monitoring module 204 and integrates external data sources that are supportive to correlated analytics. A common data model is the basis of correlation analytics, and the unified data store 503 is utilized to archive both the original data and the converted data. The unified data store 503 also supports unstructured data archiving.

The unified data store 503 utilizes a common data model for heterogeneous monitoring information data received from different ones of the two or more monitoring tools. In some embodiments, the common data model utilizes column families in a schema-on-the-fly where column families are added, removed and adjusted at runtime based on changes in monitoring workloads. A column family comprises an object defined by a key-value pair, the key-value pair mapping a key to a value representing a set of columns having different data types associated therewith.

To realize a common data model and a unified data store, some embodiments utilize a NoSQL system such as HBase supporting column family and schema-on-the-fly. In such embodiments, a column family is a NoSQL object that contains columns of related data. A column family may be represented as a tuple such as a key-value pair, where the key is mapped to a value that is a set of columns with various data types like text, blob and numeric. A common data model is derived from heterogeneous monitoring data by defining a corresponding column family for each kind of monitoring data type. The NoSQL system will handle the issues of data storage efficiency. Schema-on-the-fly means the column families can be added, removed and adjusted at runtime to cater to changes of monitoring workloads.

Data processing component 505 is configured to perform data normalization. In some embodiments, data normalization is conducted using database Extract, Transform, Load (ETL) approaches. In other embodiments, data normalization may be conducted using Hadoop-based approaches. Data transfer to correlation analytics can be performed using batch processing component 550-1, interactive processing component 550-2, real time processing component 550-3, or using a combination of the components 550. In some embodiments, batch processing component 550-1 utilizes Hadoop, interactive processing component 550-2 utilizes Pivotal DB and real time processing component 550-3 utilizes GemFire. Data transfer to correlation analytics can be triggered proactively or passively by the analytics module 206.

After data integration using the data integration component 501, the analytics module 206 may perform or apply correlation analytics to understand the inter-dependencies of storage, compute and networking across all components in the SDDC 202. Such correlation analytics are useful in a variety of contexts, as will be described in further detail below. The correlation analytics may operate on data collected by the monitoring component 204 and on aggregated data derived from embedded analytics functions of different ones of the monitoring tools 410. Correlation analytics can rely on mature and powerful data analytics techniques and systems such as data mining, machine learning and other database techniques. As shown in FIG. 5, the analytics module 204 may perform real-time analytics for fast event altering and action as well as offline analytics for advanced decision support making.

Figure 6:
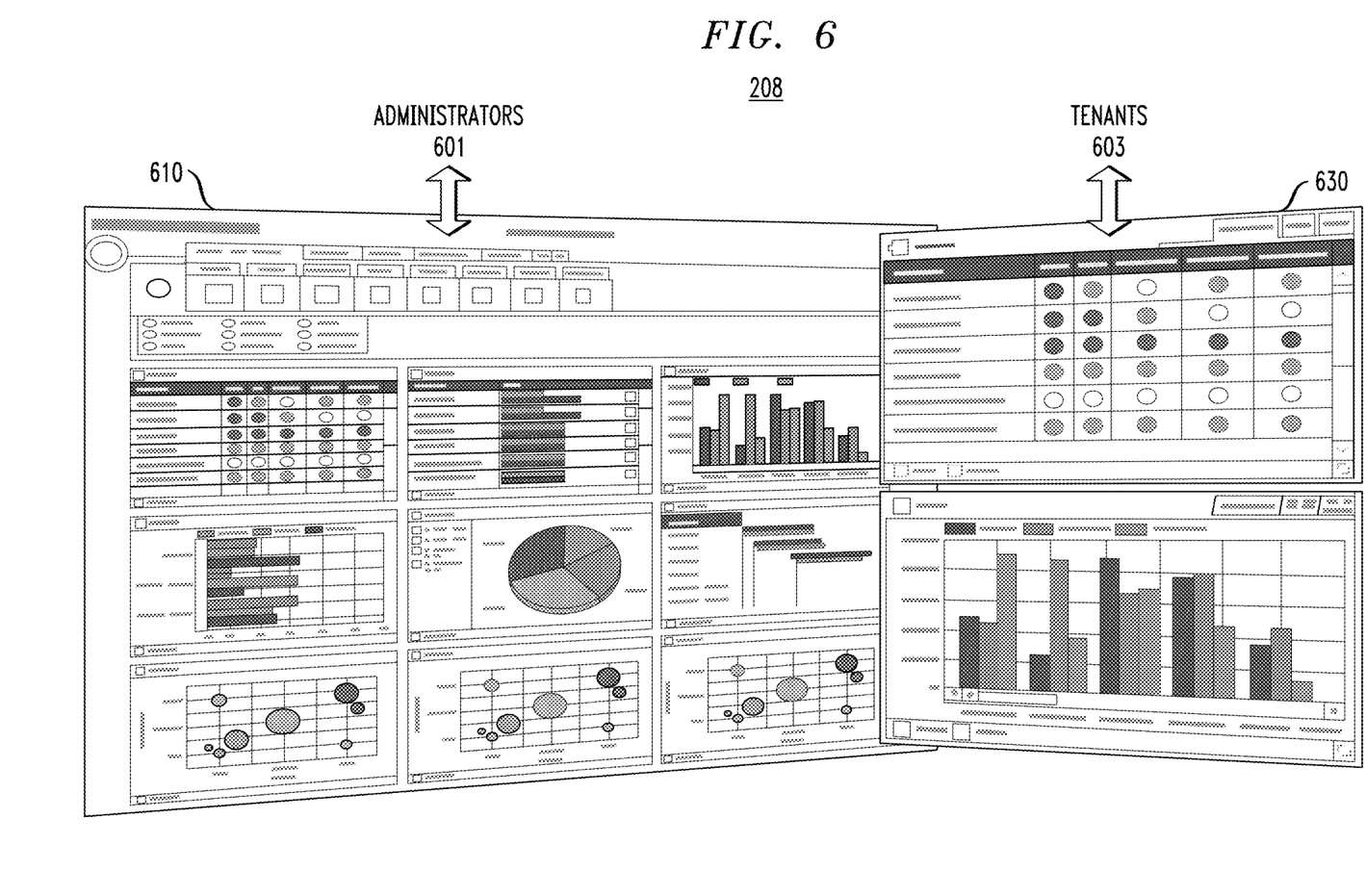
FIG. 6 illustrates a visualization module of the monitoring and analytics system of FIG. 2, according to an embodiment of the invention.

FIG. 6 shows a detailed view of a monitoring dashboard provided by the visualization module 208. Analytics results from the monitoring tools 410, as well as correlation analytics from the analytics module 206 may be used in various ways. First, such analytics results may be delivered to end-users in a straightforward and vivid way through a monitoring dashboard. Second, the analytics results may be fed back to the SDDC control feedback component 303 of the SDDC 202 for smart and secure storage and data services.

The monitoring dashboard of the visualization module 208 in some embodiments provides for different types of views for different types of users, such as system administrators 601 and tenants 603 of the SDCC 202. The monitoring dashboard may present analytics results by switching between a view 610 for system administrators of the SDCC 202 and a view 630 for tenants of the SDCC 202. The monitoring dashboard supports seamlessly switching between such views for different types of monitoring data visualization. In some embodiments, the different views 610 and 630 may tailor and incorporate reusable dashboard displays of respective ones of the monitoring tools 410 into a unified monitoring dashboard that will be visible to administrators 601 and tenants 603.

The view 610 provides horizontal monitoring for compute, storage and networking components of the SDCC 202 utilized by two or more of a plurality of tenants of the SDCC 202, while the view 630 provides vertical monitoring including statistics for compute, storage and networking components of the computing system utilized by a given one of the plurality of tenants of the SDCC 202.

Figure 7:
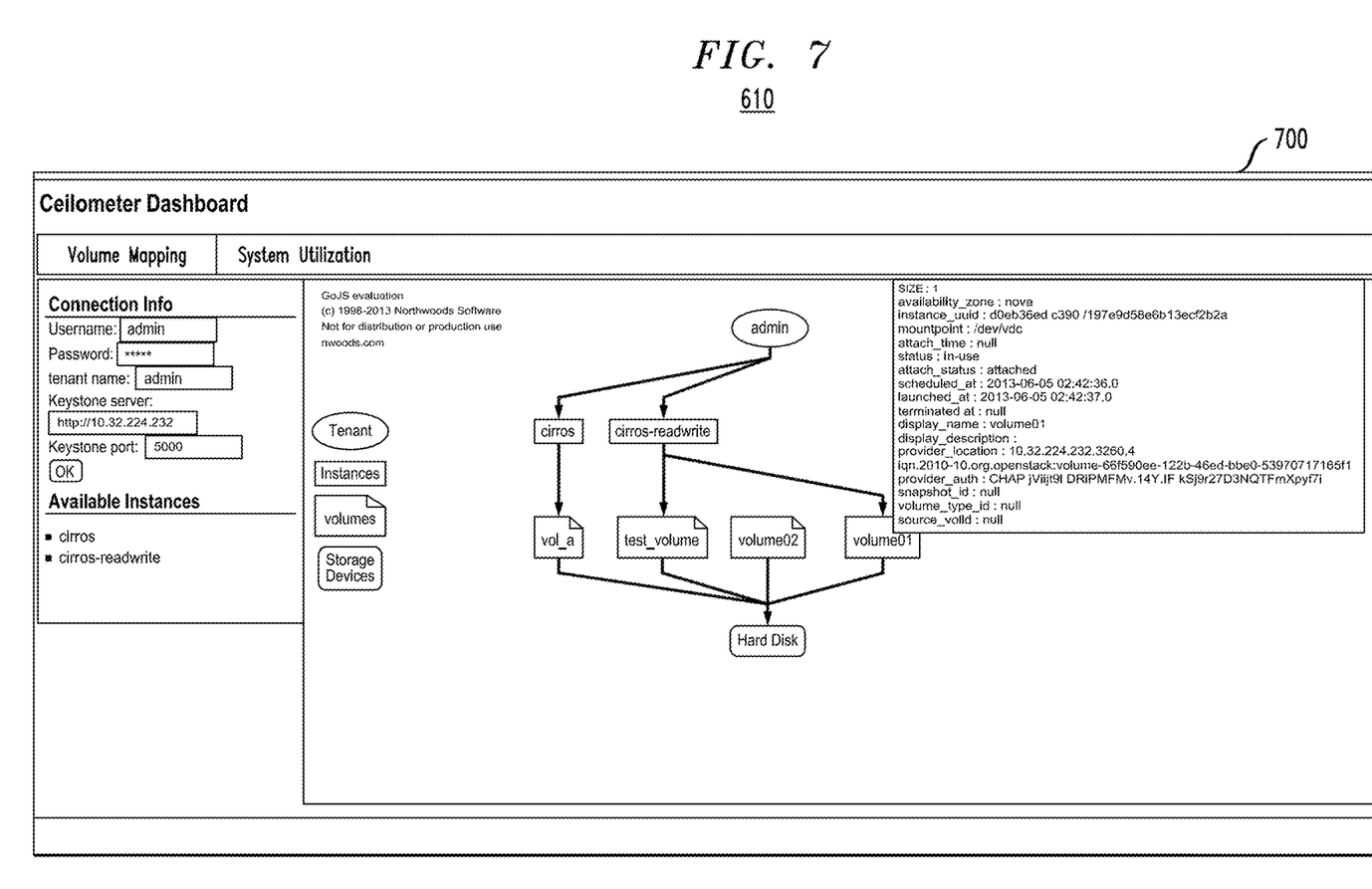
FIG. 7 illustrates an administrator view provided by the visualization module of FIG. 6, according to an embodiment of the invention.

For administrators 601, the view 610 may provide information relating to the utilization of each resource of the whole SDCC 202. Thus, if one resource has a problem or performance bottleneck, a system administrator can identify which tenant has caused the problem or bottleneck. The system administrator can also re-allocate resources among the tenants for system optimization. FIG. 7 illustrates an example dashboard 700 of view 610 that depicts mapping relationships between tenants and physical storage devices, as well as the mappings between virtual volume and VM instances.

Figure 8:
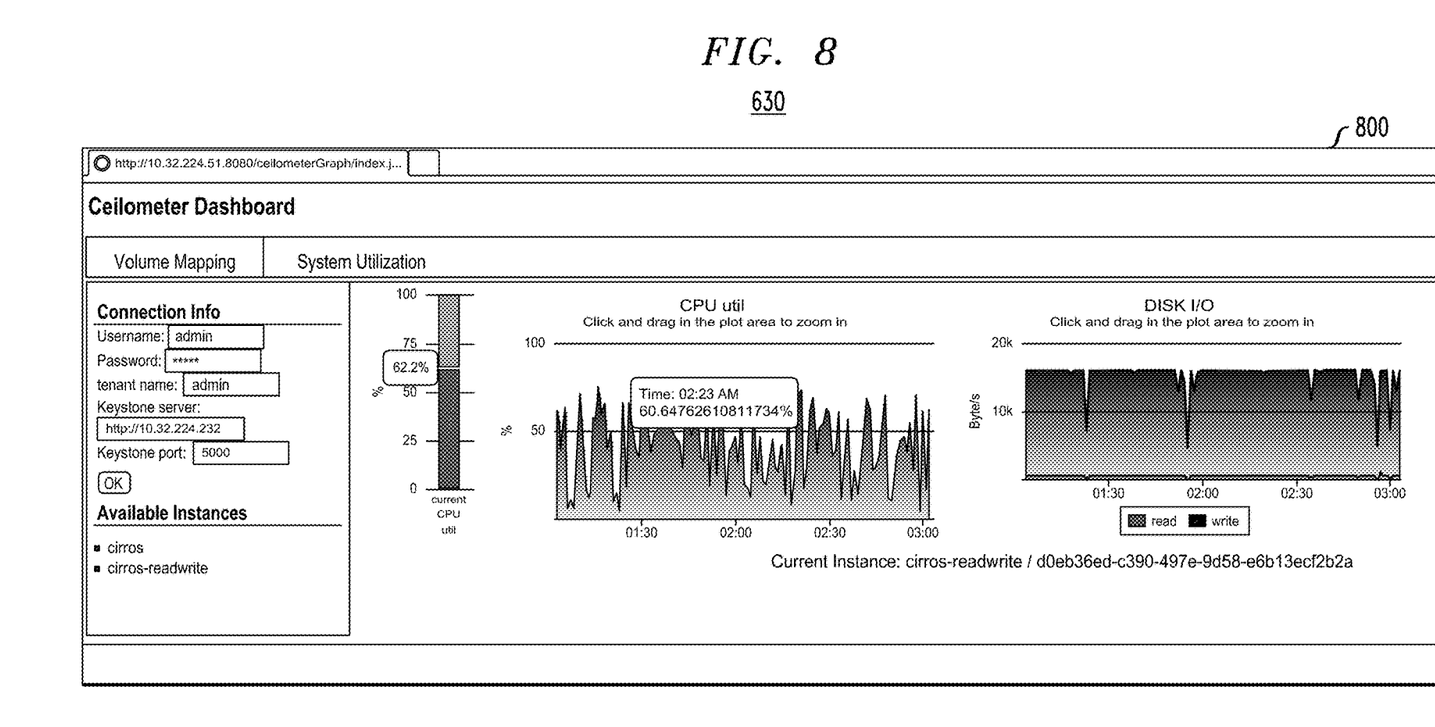
FIG. 8 illustrates a tenant view provided by the visualization module of FIG. 6, according to an embodiment of the invention.

For tenants 603, the view 630 may shows statistics of each resource that the tenant utilizes in the SDCC 202. A tenant may alter its resource usage by adding more of a given type of resource if the provisioned resources of that type are insufficient. A tenant may also alter its resource usage by releasing redundant resources to lower costs. FIG. 8 illustrates an example dashboard 800 of view 630 depicting system utilization.

It is important to note that the particular views 610 and 630 and dashboards 700 and 800 shown in FIGS. 6-8 are presented by way of example only. In other embodiments, the visualization module 208 may provide additional or alternative views and dashboards including more or less information than that shown in the specific examples of FIGS. 6-8.

Figure 9:
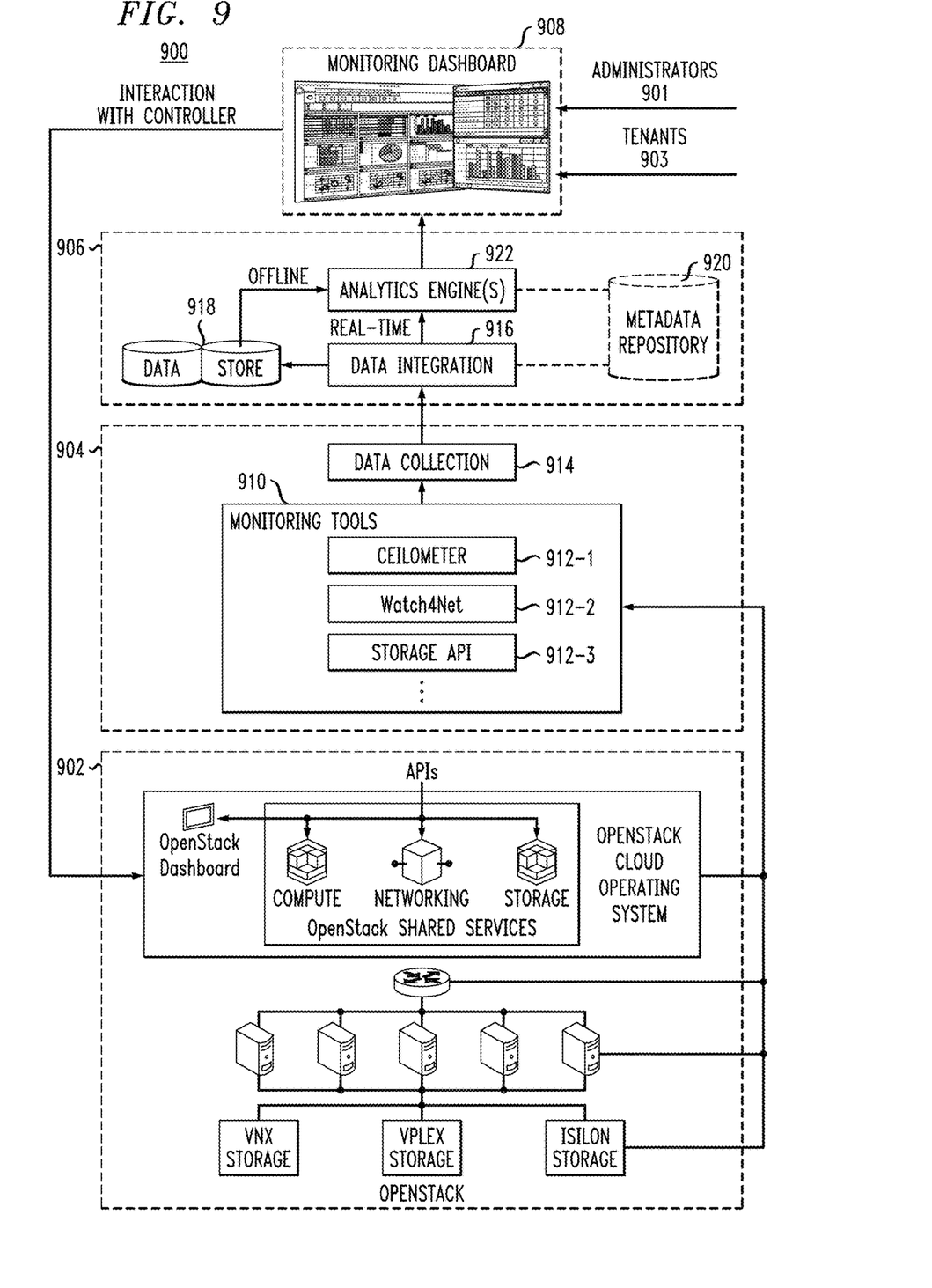
FIG. 9 illustrates another monitoring and analytics system, according to an embodiment of the invention.

FIG. 9 shows a monitoring and analytics system 900. The system 900 includes SDDC 902, which is illustratively shown in FIG. 9 as running an OpenStack IaaS layer including an OpenStack Dashboard with OpenStack Shared Services and compute, networking and storage components. Similar to the SDDC 202 shown in FIG. 3, the SDDC 902 includes networking components (e.g., routers, switches, etc.), compute components (e.g., servers, hosts, etc.) and storage components (e.g., storage arrays, storage devices, etc.). Specifically, the SDDC 902 shows VNX, VPLEX and Isilon storage systems (commercially available from EMC Corporation, Hopkinton, Mass.).

The system 900 further includes a monitoring module 904, which includes a monitoring tool integration component 910 including Ceilometer tool 912-1, Watch4Net tool 912-2 and Storage API tool 912-3. The monitoring module 904 further includes a data collection component 914. The monitoring tool integration component 910 and the data collection component 914 may be configured in a manner similar to that described above with respect to the monitoring tool integration and orchestration component 401 and a data collection component 403, respectively.

System 900 also includes an analytics module 906, including a data integration component 916, a data store 918, a metadata repository 920 and analytics engines 922. The data integration component 916 is configured to consolidate monitoring information received from data collection component 914 via the monitoring tools 912 in accordance with metadata stored in the metadata repository 920. The consolidated monitoring information is stored in the data store 918, which is a unified data store configured in a manner similar to the unified data store 503 described above. Analytics engines 922 can perform real-time correlation analytics using information from the data integration component 916, as well as offline analytics for deeper analysis using the data store 918.

System 900 further includes visualization module 908, which provides a monitoring dashboard or other user interface for administrators 901 and tenants 903 to view analytics results provided by the analytics module 906. The visualization module 908 may also provide feedback to the SDDC 902 in a manner similar to that described above with respect to SDDC control feedback component 303.

In IaaS environments, multi-tenancy becomes a consideration that reaches all the way down to a storage layer of a computing environment such as an SDDC. Storage monitoring for such multi-tenancy arrangements is varied. At runtime, each storage tenant may desire a separate and converged overview of its allocated (dedicated or pooled) storage resources, including resource status and usage and assurance statistics regarding Service Level Objectives (SLOs). System administrators, such as storage resource managers, desire a clear picture or overview of how active storage resources are distributed among and utilized by multiple tenants in order to support fast, fine-grained and effective resource management.

The system 900 shows an example implementation realizing multi-tenant aware storage monitoring wherein storage products such as EMC VNX, VPLEX and Isilon are managed by OpenStack and provided to tenants as an on-demand service. Delivered functionality of the system 900 includes, by way of example: collection of metrics and event data; integration of monitored data, including performance metrics from compute and storage components of the SDDC 902; persisting monitored data into a common or unified data store 918; auto-learning tenant-resource storage mapping relations by analyzing the integrated data; computing metrics and filtering out events of storage resources for individual tenants; and visualizing monitoring and analytics results on a per-tenant basis. Such functionality is provided by the various components and modules of system 900 described above.

For example, data collection component 914 collects I/O metrics via the Ceilometer tool 912-1, and hypervisors if necessary. I/O metrics from storage providers such as VNX are retrieved by Watch4Net tool 912-2 or other storage APIs 912-3. Metric data integration utilizes metadata information from the OpenStack Cinder driver to determine storage resource mapping relationships. Analytics engine 922 conducts correlation mining for performance monitoring and decision making for other work streams, e.g., identifying I/O latency bottlenecks. Analytics results are presented in a monitoring dashboard provided by visualization module 908. In some embodiments, analytics results are also made available to a controller of the SDDC 902. Actionable analytics results may be applied by the SDDC controller for further improving efficiency in managing the infrastructure of the SDDC 902. In some embodiments, the system 900 provides for end to end Internet Small Computer System Interface (iSCSI) performing monitoring and analysis, metric integration for storage performance monitoring, abnormal I/O access pattern detection, and unmatched metric detection and alerting.

Figure 10:
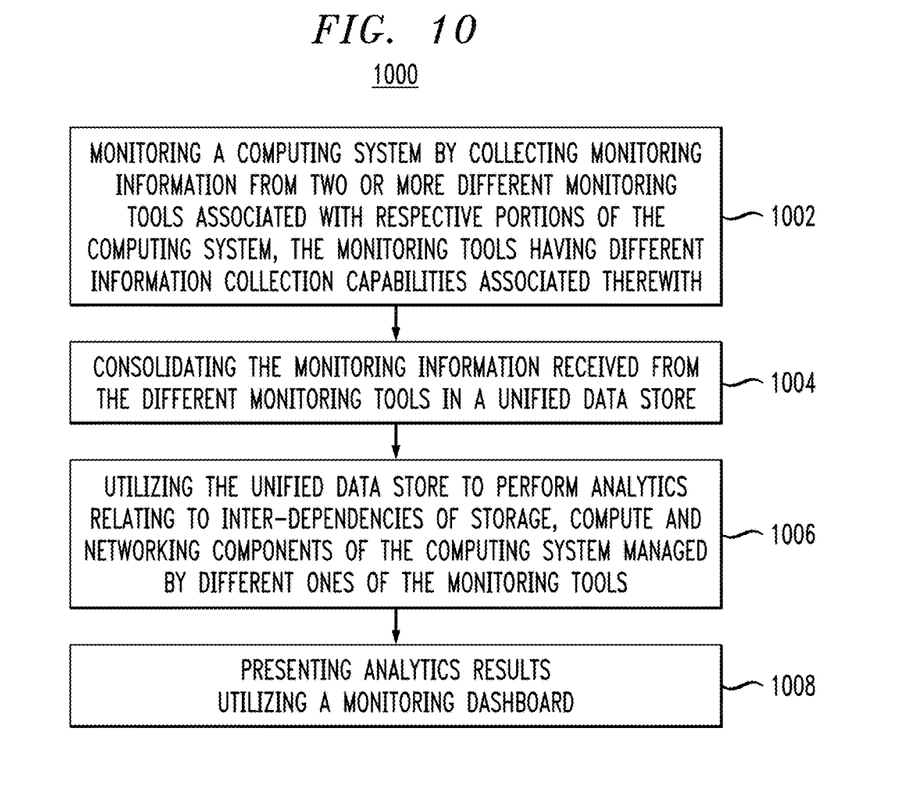
FIG. 10 illustrates a methodology for monitoring and analytics, according to an embodiment of the invention.

FIG. 10 illustrates a methodology 1000 for monitoring and analytics, according to an embodiment of the invention.

As shown in step 1002, a computing system is monitored by collecting monitoring information from two or more different monitoring tools associated with respective portions of the computing system, the monitoring tools having different information collection capabilities associated therewith.

In step 1004, the monitoring information received from the different monitoring tools is consolidated in a unified data store.

In step 1006, the unified data store is utilized to perform analytics relating to inter-dependencies of storage, compute and networking components of the computing system managed by different ones of the monitoring tools.

In step 1008, analytics results are presented utilizing a monitoring dashboard. The monitoring dashboard may comprise a user interface permitting different types of users, such as tenants and administrators of the computing system, to view different portions of the analytics results and manage components of the computing system.

Embodiments provide various advantages for monitoring and analytics in computing systems such as SDDCs. Some embodiments allow for declarative and on-demand monitoring via a unified user portal, which automatically decomposes user monitoring needs into monitoring tasks, each of which will be undertaken by one or several monitoring tools, where the different monitoring results are aggregated to provide a more comprehensive view of the run-time status of the whole computing system. Embodiments can provide this comprehensive view in a transparent manner for end users such that the end users do not need to manually manage different monitoring tools for different portions of the computing system. This user-friendly monitoring has various advantages, including high flexibility, extensibility and scalability. Embodiments can thus provide monitoring-as-a-service.

Modern data centers, including some SDDCs, are complicated and thus difficult to operate utilizing human decision making. Some embodiments provide converged or consolidated correlation analysis from different data center layers so as to understand storage, compute and networking inter-dependencies across all components in a computing system such as an SDDC. Such converged correlation analysis, by way of example, can provide for monitoring resource usage and runtime states on an individual per-tenant perspective by collecting, consolidating and integrating performance metrics from compute and storage sub-systems or components together with meta-information relating to resource mapping. Some embodiments provide for policy-based data integration to clean or consolidate diverse monitoring data. For example, embodiments may utilize a NoSQL system supporting column family and schema-on-the-fly for a common data model in a unified data store.

Some embodiments further provide a unified monitoring dashboard user interface, which allows for seamless display switching between views for different types of users including vertical monitoring for tenants of a computing system and horizontal monitoring for system administrators. The monitoring dashboard may further tailor and incorporate reusable dashboard displays from underlying monitoring tools in a unified monitoring dashboard.

Figure 11:
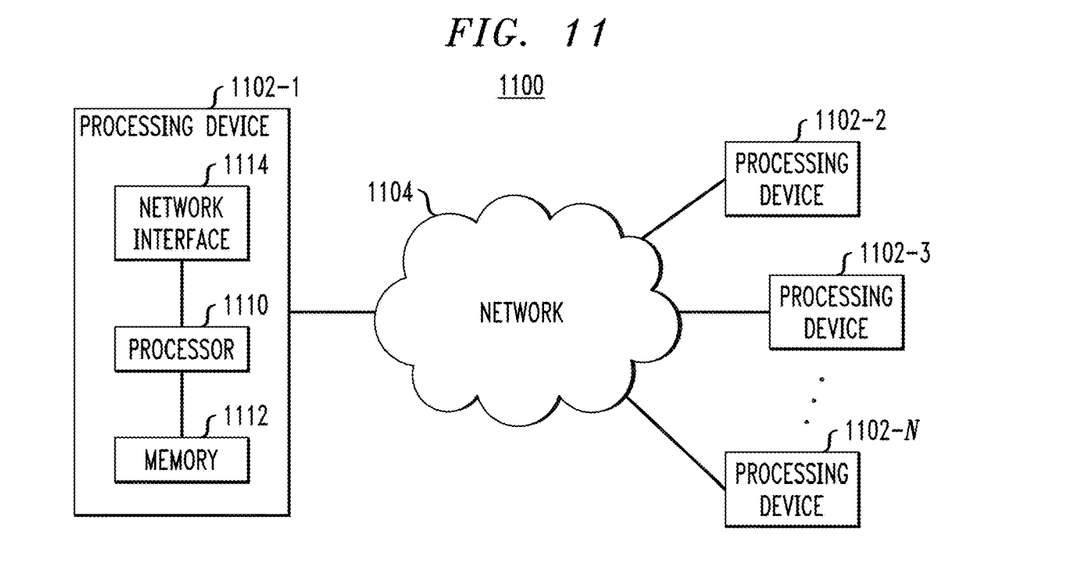
FIG. 11 illustrates a processing platform used to implement a monitoring and analytics system, according to an embodiment of the invention.

An example of a processing platform on which a monitoring and analytics system (e.g., the system 100 of FIG. 1, the system 200 of FIG. 2 and the system 900 of FIG. 9) can be implemented is processing platform 1100 shown in FIG. 11. The processing platform 1100 in this embodiment comprises a plurality of processing devices, denoted 1102-1, 1102-2, 1102-3, . . . 1102-N, which communicate with one another over a network 1104. It is to be appreciated that the methodologies described herein may be executed in one such processing device 1102, or executed in a distributed manner across two or more such processing devices 1102. It is to be further appreciated that a server, a client device, a computing device or any other processing platform element may be viewed as an example of what is more generally referred to herein as a "processing device." As illustrated in FIG. 11, such a device generally comprises at least one processor and an associated memory, and implements one or more functional modules for instantiating and/or controlling features of systems and methodologies described herein. Multiple elements or modules may be implemented by a single processing device in a given embodiment.

The processing device 1102-1 in the processing platform 1100 comprises a processor 1110 coupled to a memory 1112. The processor 1110 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1110. Memory 1112 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1112 may comprise electronic memory such as random access memory (RAM), read-only memory (ROM) or other types of memory, in any combination. The one or more software programs when executed by a processing device such as the processing device 1102-1 causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1102-1 also includes network interface circuitry 1114, which is used to interface the device with the network 1104 and other system components. Such circuitry may comprise conventional transceivers of a type well known in the art.

The other processing devices 1102 (1102-2, 1102-3, . . . 1102-N) of the processing platform 1100 are assumed to be configured in a manner similar to that shown for computing device 1102-1 in the figure.

The processing platform 1100 shown in FIG. 11 may comprise additional known components such as batch processing systems, parallel processing systems, physical machines, virtual machines, virtual switches, storage volumes, etc. Again, the particular processing platform shown in this figure is presented by way of example only, and the monitoring and analytics systems 100, 200 and 900 shown in FIGS. 1, 2 and 9, respectively, may include additional or alternative processing platforms, as well as numerous distinct processing platforms in any combination.

Also, numerous other arrangements of servers, clients, computers, storage devices or other components are possible in processing platform 1100. Such components can communicate with other elements of the processing platform 1100 over any type of network, such as a wide area network (WAN), a local area network (LAN), a satellite network, a telephone or cable network, or various portions or combinations of these and other types of networks.

Furthermore, it is to be appreciated that the processing platform 1100 of FIG. 11 can comprise VMs implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1100 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1100 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and Symmetrix VMAX (commercially available from EMC Corporation, Hopkinton, Mass.). A variety of other computing and storage products may be utilized to implement the one or more services that provide the functionality and features described herein.

It was noted above that portions of the systems 100, 200 and 900 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    monitoring a software-defined data center (SDDC) by collecting monitoring information from two or more different monitoring tools associated with respective portions of the SDDC, the monitoring tools having different information collection capabilities associated therewith;
    wherein monitoring the SDDC comprises:
        receiving a monitoring request directed to the SDDC;
        decomposing the monitoring request into one or more sub-tasks associated with corresponding metrics and events;
        classifying the metrics and events into two or more groups; and
        linking each group of metrics to a set of the monitoring tools with corresponding information collection capabilities;
    consolidating the monitoring information received from the different monitoring tools in a unified data store;
    utilizing the unified data store to perform analytics relating to inter-dependencies of storage, compute and networking components of the SDDC managed by different ones of the monitoring tools;
    presenting results of the analytics utilizing a monitoring dashboard; and
    in response to presenting the results of the analytics, causing the SDDC to carry out one of re-allocating resources of each of the storage, compute and networking components of the SDDC or changing resource usage of each of the storage, compute and networking components of the SDDC; and
    wherein the method is performed by one or more processing devices each comprising a processor operatively coupled to a memory.

2. The method of claim 1, wherein the storage, compute and networking components of the SDDC comprise at least one storage component, wherein the metrics and events comprise storage component metrics and events associated with the at least one storage component, and wherein the storage component metrics and events comprise one or more of:
    block device, file storage and object storage metrics associated with the at least one storage component;
    mapping and topology related events including at least one of creating, editing or deleting a block device, a file storage or an object storage associated with the at least one storage component; and
    health and alert logs associated with the at least one storage component.

3. The method of claim 1, wherein the storage, compute and networking components of the SDDC comprise at least one compute component, wherein the metrics and events comprise compute component metrics and events associated with the at least one compute component, and wherein the compute component metrics and events comprise one or more of:

notifications associated with at least one virtual machine of the at least one compute component, the notifications associated with the at least one virtual machine including at least one of starting, stopping or restarting the at least one virtual machine;

notifications associated with creating an image, instance or volume of at least a portion of the at least one compute component; metrics associated with at least one of the availability and usage of the at least one compute component; and mapping and topology related events including migration of a virtual machine associated with the at least one compute component.

4. The method of claim 1, wherein the storage, compute and networking components of the SDDC comprise at least one networking component, wherein the metrics and events comprise networking component metrics and events associated with the at least one networking component, and wherein the networking component metrics and events comprise one or more of:

network traffic metrics for back-end components and tenant-level applications;

network configuration events including adding, editing and removing network identifiers; and network traffic metrics for underlying physical components of the at least one networking component.

5. The method of claim 1, wherein consolidating the monitoring information received from the different monitoring tools comprises consolidating metrics, events and logs from the monitoring tools according to metadata stored in a metadata repository.

6. The method of claim 1, wherein consolidating the monitoring information received from the different monitoring tools is performed in accordance with one or more policies.

7. The method of claim/wherein at least one of the one or more policies specifies consolidation of one or more of the metrics and events on a per-tenant basis or on a per-host basis.

8. The method of claim 1, wherein the unified data store utilizes a common data model for heterogeneous monitoring information data received from different ones of the two or more monitoring tools.

9. The method of claim 1, wherein utilizing the unified data store to perform analytics comprises utilizing the consolidated monitoring information in combination with embedded analytics functions associated with respective ones of the monitoring tools.

10. The method of claim 1, wherein the monitoring dashboard is configured to switch between a first view for tenants of the SDDC and a second view for system administrators of the SDDC.

11. The method of claim 10, wherein the first view comprises vertical monitoring including statistics for compute, storage and networking components of the SDDC utilized by a given one of a plurality of tenants of the SDDC, and the second view comprises horizontal monitoring for compute, storage and networking components of the SDDC utilized by two or more of a plurality of tenants of the SDDC.

12. The method of claim 11, wherein the second view comprises mapping relationships between respective ones of the two or more tenants and at least one of: physical storage devices in the SDDC; virtual volumes of the SDDC; and virtual machine instances of the SDDC.

13. An article of manufacture comprising a non-transitory processor-readable storage medium having encoded therein executable code of one or more software programs, wherein the one or more software programs when executed by one or more processing devices cause the one or more processing devices to:

monitor a software-defined data center (SDDC) by collecting monitoring information from two or more different monitoring tools associated with respective portions of the SDDC, the monitoring tools having different information collection capabilities associated therewith;

wherein, in monitoring the SDDC, the one or more software programs when executed by the one or more processing devices cause the one or more processing devices to:

receive a monitoring request directed to the SDDC; and decompose the monitoring request into one or more sub-tasks associated with corresponding metrics and events;

classify the metrics and events into two or more groups; and link each group of metrics to a set of the monitoring tools with corresponding information collection capabilities;

consolidate the monitoring information received from the different monitoring tools in a unified data store; utilize the unified data store to perform analytics relating to inter-dependencies of storage, compute and networking components of the SDDC managed by different ones of the monitoring tools;

present results of the analytics utilizing a monitoring dashboard; and in response to presenting the results of the analytics, causes the SDDC to carry out one of re-allocating resources of each of the storage, compute and networking components of the SDDC or changing resource usage of each of the storage, compute and networking components of the SDDC.

14. The article of manufacture of claim 13, wherein the storage, compute and networking components of the SDDC comprise at least one storage component, wherein the metrics and events comprise storage component metrics and events associated with the at least one storage component, and wherein the storage component metrics and events comprise one or more of:

block device, file storage and object storage metrics associated with the at least one storage component;

mapping and topology related events including at least one of creating, editing or deleting a block device, a file storage or an object storage associated with the at least one storage component; and health and alert logs associated with the at least one storage component.

15. The article of manufacture of claim 13, wherein consolidating the monitoring information received from the different monitoring tools comprises consolidating metrics, events and logs from the monitoring tools according to metadata stored in a metadata repository.

16. The article of manufacture of claim 13, wherein consolidating the monitoring information received from the different monitoring tools is performed in accordance with one or more policies.

17. The article of manufacture of claim 16 wherein at least one of the one or more policies specifies consolidation of one or more of the metrics and events on a per-tenant basis or on a per-host basis.

18. An apparatus comprising:
a memory; and a processor operatively coupled to the memory and configured to:
monitor a software-defined data center (SDDC) by collecting monitoring information from two or more different monitoring tools associated with respective portions of the SDDC, the monitoring tools having different information collection capabilities associated therewith:
wherein, in monitoring the SDDC, the processor is configured to:
receive a monitoring request directed to the SDDC;
decompose the monitoring request into one or more sub-tasks associated with corresponding metrics and events;
classify the metrics and events into two or more groups; and
link each group of metrics to a set of the monitoring tools with corresponding information collection capabilities;
consolidate the monitoring information received from the different monitoring tools in a unified data store; utilize the unified data store to perform analytics relating to inter-dependencies of storage, compute and networking components of the SDDC managed by different ones of the monitoring tools;
present results of the analytics utilizing a monitoring dashboard; and
in response to presenting the results of the analytics, causes the SDDC to carry out one of re-allocating resources of each of the storage, compute and networking components of the SDDC or changing resource usage of each of the storage, compute and networking components of the SDDC.

19. The apparatus of claim 18, wherein the storage, compute and networking components of the SDDC comprise at least one storage component, wherein the metrics and events comprise storage component metrics and events associated with the at least one storage component, and wherein the storage component metrics and events comprise one or more of:
block device, file storage and object storage metrics associated with the at least one storage component;
mapping and topology related events including at least one of creating, editing or deleting a block device, a file storage or an object storage associated with the at least one storage component; and
health and alert logs associated with the at least one storage component.

20. The apparatus of claim 18, wherein utilizing the unified data store to perform analytics comprises utilizing the consolidated monitoring information in combination with embedded analytics functions associated with respective ones of the monitoring tools.

\* \* \* \* \*

UNITED STATES PATENT AND TRADEMARK OFFICE
CERTIFICATE OF CORRECTION

PATENT NO.        : 10,536,355 B1
APPLICATION NO.   : 14/742183
DATED             : January 14, 2020
INVENTOR(S)       : Yu Cao et al.

Page 1 of 1

It is certified that error appears in the above-identified patent and that said Letters Patent is hereby corrected as shown below:

In the Claims

Column 13, Claim 7, Line 40, please delete "claim/wherein" and insert --claim 6, wherein--

Column 14, Claim 13, Line 20, please delete "and"

Signed and Sealed this
Third Day of March, 2020

Andrei Iancu
*Director of the United States Patent and Trademark Office*